US008887849B2

(12) United States Patent
Hite

(10) Patent No.: US 8,887,849 B2
(45) Date of Patent: Nov. 18, 2014

(54) ARTICULATED HOOD PIVOT LINKAGE

(71) Applicant: Scott D. Hite, Pilot Point, TX (US)

(72) Inventor: Scott D. Hite, Pilot Point, TX (US)

(73) Assignee: PACCAR Inc, Bellevue, WA (US)

( * ) Notice: Subject to any disclaimer, the term of this patent is extended or adjusted under 35 U.S.C. 154(b) by 4 days.

(21) Appl. No.: 13/840,437

(22) Filed: Mar. 15, 2013

(65) Prior Publication Data

US 2014/0265452 A1 Sep. 18, 2014

(51) Int. Cl.
*B62D 25/10* (2006.01)
*E05D 5/02* (2006.01)
*B62D 25/12* (2006.01)

(52) U.S. Cl.
CPC .............. *B62D 25/12* (2013.01); *E05D 5/0207* (2013.01)
USPC ....................................... 180/69.21; 180/69.2

(58) Field of Classification Search
USPC .......... 180/69.2, 69.21, 69.22, 69.23; 16/294, 16/300; 296/193.11, 203.02
See application file for complete search history.

(56) References Cited

U.S. PATENT DOCUMENTS

| | | | | |
|---|---|---|---|---|
| 3,232,368 | A * | 2/1966 | Sullivan | 180/68.3 |
| 4,382,312 | A * | 5/1983 | Liggett et al. | 16/365 |
| 4,658,470 | A * | 4/1987 | Oen | 16/241 |
| 5,101,921 | A * | 4/1992 | West et al. | 180/69.21 |
| 5,136,752 | A * | 8/1992 | Bening et al. | 16/287 |
| 5,263,546 | A * | 11/1993 | Cady et al. | 180/69.21 |
| 5,339,494 | A | 8/1994 | Esau | |
| 5,385,212 | A * | 1/1995 | Cady et al. | 180/69.21 |
| 5,435,406 | A * | 7/1995 | Gaffoglio et al. | 180/69.21 |
| 5,465,803 | A | 11/1995 | Kircher | |
| 5,730,239 | A * | 3/1998 | Holter | 180/69.21 |
| 5,890,556 | A * | 4/1999 | Shearn et al. | 180/69.21 |
| 5,975,228 | A * | 11/1999 | Parfitt | 180/69.21 |
| 5,992,550 | A * | 11/1999 | Gronlund | 180/69.21 |
| 6,030,029 | A | 2/2000 | Tsuda | |
| 6,213,235 | B1 * | 4/2001 | Elhardt et al. | 180/69.2 |
| 6,394,211 | B1 * | 5/2002 | Palenchar et al. | 180/69.21 |
| 6,454,035 | B1 * | 9/2002 | Waskow et al. | 180/89.17 |
| 6,487,754 | B1 | 12/2002 | Keen | |
| 6,637,531 | B2 * | 10/2003 | Palenchar et al. | 180/69.21 |
| 6,871,716 | B2 * | 3/2005 | Sanderson | 180/69.21 |
| 6,934,999 | B2 * | 8/2005 | Kreth et al. | 16/222 |
| 7,036,618 | B2 * | 5/2006 | Telford et al. | 180/69.2 |
| 7,195,307 | B2 * | 3/2007 | Tucker et al. | 296/190.05 |
| 7,303,035 | B2 * | 12/2007 | Muia-Longman | 180/69.21 |
| 7,416,038 | B2 * | 8/2008 | Etzler et al. | 180/69.2 |
| 7,506,716 | B1 * | 3/2009 | Salmon et al. | 180/274 |
| 7,552,789 | B2 * | 6/2009 | Gust | 180/69.21 |
| 7,597,166 | B2 * | 10/2009 | Parks | 180/69.2 |

(Continued)

FOREIGN PATENT DOCUMENTS

| | | |
|---|---|---|
| GB | 446134 | 4/1936 |
| JP | 5-319310 A | 12/1993 |

*Primary Examiner* — Hau Phan
*Assistant Examiner* — Jacob Meyer
(74) *Attorney, Agent, or Firm* — Christensen O'Connor Johnson Kindness PLLC

(57) ABSTRACT

A hood connection assembly, sometimes referred to as an articulated hood pivot linkage, for a vehicle is disclosed. The hood connection assembly is an articulating interface between a vehicle chassis member and the vehicle hood. In use, the hood connection assembly provides up to three (3) points of isolation from chassis torsion as well as providing a "virtual axis" type pivoting connection. A "virtual axis" type pivoting connection provides an upwardly and outwardly motion of hood travel.

18 Claims, 7 Drawing Sheets

(56) References Cited

U.S. PATENT DOCUMENTS

| | | | | |
|---|---|---|---|---|
| 7,766,402 | B2 * | 8/2010 | Schmidt et al. | 293/117 |
| 7,828,100 | B2 | 11/2010 | Polz | |
| 7,909,125 | B1 * | 3/2011 | Keen | 180/69.21 |
| 7,926,603 | B2 * | 4/2011 | Bonsen | 180/69.21 |
| 8,595,901 | B1 * | 12/2013 | Shaw et al. | 16/235 |
| 8,641,093 | B1 * | 2/2014 | Knight | 280/748 |
| 2002/0166707 | A1 * | 11/2002 | Palenchar et al. | 180/69.21 |
| 2004/0182617 | A1 * | 9/2004 | Sanderson | 180/69.21 |
| 2004/0232729 | A1 * | 11/2004 | Kreth et al. | 296/193.11 |
| 2005/0067205 | A1 * | 3/2005 | Watanabe et al. | 180/69.21 |
| 2006/0070832 | A1 * | 4/2006 | Adoline et al. | 188/283 |
| 2006/0175104 | A1 * | 8/2006 | Etzler et al. | 180/69.2 |
| 2007/0080010 | A1 * | 4/2007 | Gust | 180/69.2 |
| 2007/0151791 | A1 * | 7/2007 | Gust | 180/274 |
| 2007/0187993 | A1 * | 8/2007 | Kalargeros | 296/193.11 |
| 2008/0211242 | A1 * | 9/2008 | Schmidt et al. | 293/155 |
| 2009/0194348 | A1 * | 8/2009 | Faubert et al. | 180/69.21 |
| 2010/0096202 | A1 * | 4/2010 | Bonsen | 180/69.21 |
| 2011/0115260 | A1 * | 5/2011 | Mizuta | 296/203.01 |
| 2013/0025954 | A1 * | 1/2013 | Miller et al. | 180/69.21 |

* cited by examiner

ARTICULATED HOOD PIVOT LINKAGE

BACKGROUND

Hood motion control structures are well known in the heavy duty truck industry and generally comprise a pivotal mounting of the hood about a fixed horizontal pivot axis located adjacent the front bumper of the truck. Some of the heavy duty truck hoods of this type include the front and sides wall of the engine compartment, as well as the fenders, headlights, and reinforcing members, all of which results in substantial weight. It has therefore become necessary with most conventional hoods to provide devices, such as springs and shock absorbers, to control the motion of the hood between the open and closed positions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a hood pivot linkage assembly is provided, which is configured to articulatingly mount a hood to a chassis member. The assembly includes a central coupling interface that includes a link member configured to be pivotally coupled at a first end to the hood and pivotally couple at a second end to the chassis member via a chassis mount about a first fixed axis, wherein the chassis mount is configured to isolate the hood from torsional movement of the chassis member. The assembly also includes first and second lateral coupling interfaces spaced from and flanking the central coupling interface. In some embodiments, the first and second lateral interfaces each includes a link member configured to be pivotally coupled at a first end to the hood and pivotally coupled at a second end to the vehicle chassis via a chassis mount about a second fixed axis. The first and second coupling interfaces form a four bar linkage in conjunction with the hood and the chassis member.

In accordance with another aspect of the present invention, a vehicle hood connection assembly is providing for articulatingly mounting a hood to a chassis member. The assembly includes a central coupling interface including a link member, a hood mount configured to be mountable to the hood, and a chassis mount configured to be mountable to the chassis member. The link member is some embodiments is configured to be pivotally coupled at a first end to the hood mount about a first pivot and pivotally couple at a second end to the chassis mount about a second, fixed pivot. The chassis mount is also configured to allow some rotation of the central coupling interface about a second axis generally perpendicular to the pivot axis of the second fixed pivot. The assembly also includes left and right coupling interfaces spaced from and flanking the central coupling interface. The left and right coupling interfaces in some embodiments each include a link member, a hood mount configured to be mountable to the hood, and a chassis mount configured to be mountable to the chassis member. The link member of the left and right coupling interfaces are configured to be pivotally coupled at a first end to the hood mount of the left and right coupling interfaces about a third pivot and pivotally couple at a second end to the chassis mount of the left and right coupling interfaces about a fourth, fixed pivot. The left and right coupling interfaces form a four bar linkage in conjunction with the hood and the chassis member when coupled thereto.

In yet another aspect of the present disclosure, a vehicle is provided. The vehicle includes a chassis structure, a hood, and a hood coupling configured to coupled a forward portion of the hood to the chassis structure in an articulating manner. In some embodiments, the hood coupling includes a central coupling interface that include a link member, a hood mount configured to be mountable to the hood, and a chassis mount configured to be mountable to the chassis structure. In some embodiments, the link member is configured to be pivotally coupled at a first end to the hood mount about a first pivot and pivotally couple at a second end to the chassis mount about a second, fixed pivot. The chassis mount is configured to allow some rotation of the central coupling interface about a second axis generally perpendicular to the pivot axis of the second fixed pivot. The coupling also includes left and right coupling interfaces spaced from and flanking the central coupling interface. The left and right coupling interfaces in some embodiments each include a link member, a hood mount configured to be mountable to the hood, and a chassis mount configured to be mountable to the chassis structure. The link member of the left and right coupling interfaces can be configured to be pivotally coupled at a first end to the hood mount of the left and right coupling interfaces about a third pivot and pivotally couple at a second end to the chassis mount of the left and right coupling interfaces about a fourth, fixed pivot. The left and right coupling interfaces form a four bar linkage in conjunction with the hood and the chassis structure when coupled thereto.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following description sets forth one or more examples of a hood connection assembly, sometimes referred to as an articulated hood pivot linkage, for vehicles, such as medium to heavy duty truck (Class 6-8). Generally, embodiments described herein relate to the interface between a vehicle chassis member and the vehicle hood. In use, the interface provides up to three (3) points of isolation from chassis torsion as well as providing a "virtual axis" type pivoting connection. A "virtual axis" type pivoting connection provides an upwardly and outwardly motion of hood travel.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

Figure 1:
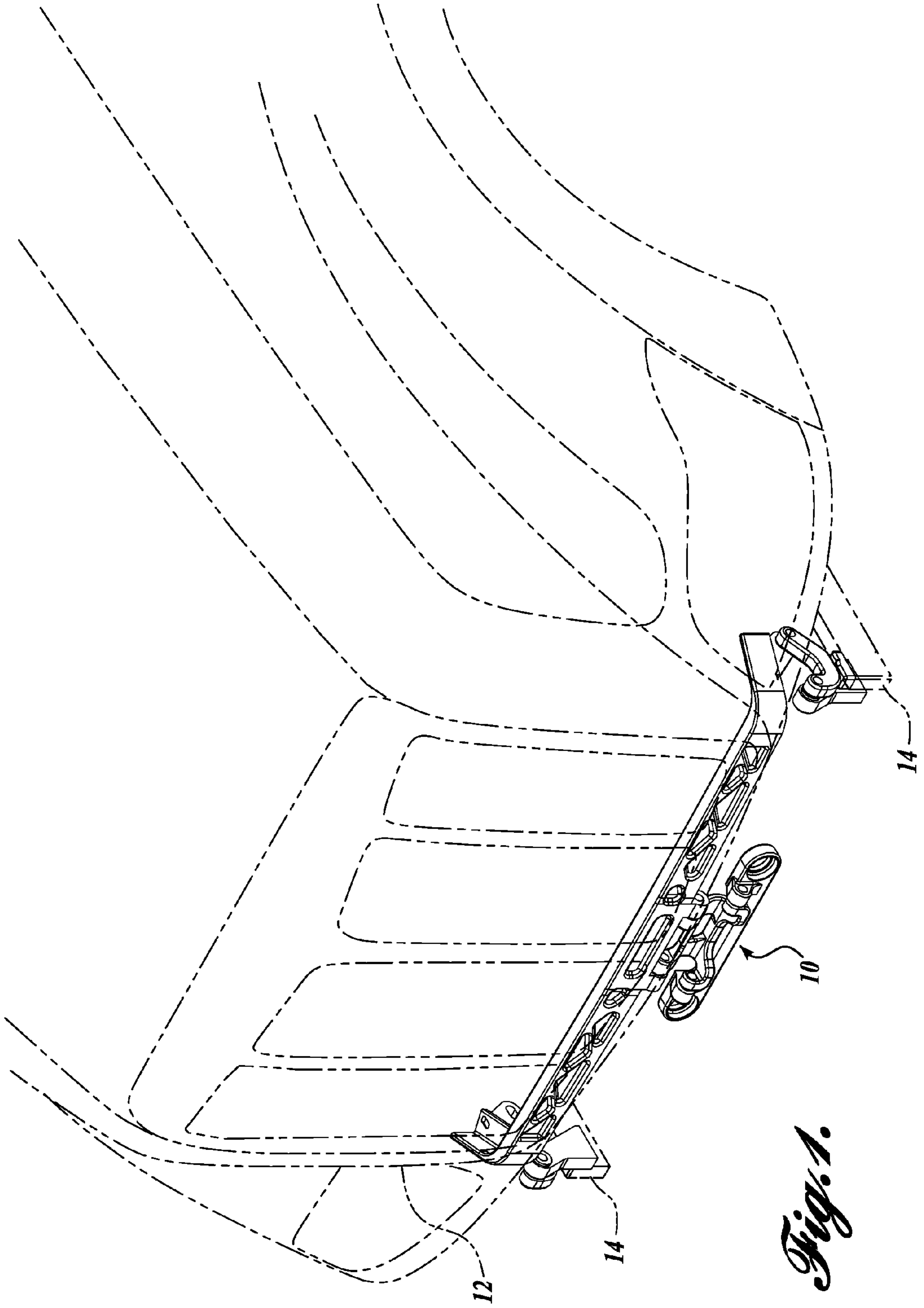
FIG. 1 illustrates one example of a hood connection assembly for interfacing between a vehicle hood and a vehicle chassis in accordance with aspects of the present disclosure.

FIG. 1 illustrates one example of a hood connection assembly 10 for interfacing between a vehicle hood 12 and a vehicle chassis 14. Generally described, the hood connection assembly 10 is suitable to pivotally connect the forward section of the hood of a vehicle to the vehicle's chassis. In embodiments described herein, hoods of these vehicles are pivotally attached at their forward ends to the vehicle chassis and pivot forwardly to gain access to the engine compartment. While examples described herein may reference a vehicle of the medium to heavy duty truck (Class 6-8) type, it will be appreciated that aspects of the present disclosure may be practiced with any type of vehicle having a forwardly articulating hood.

Figure 2:
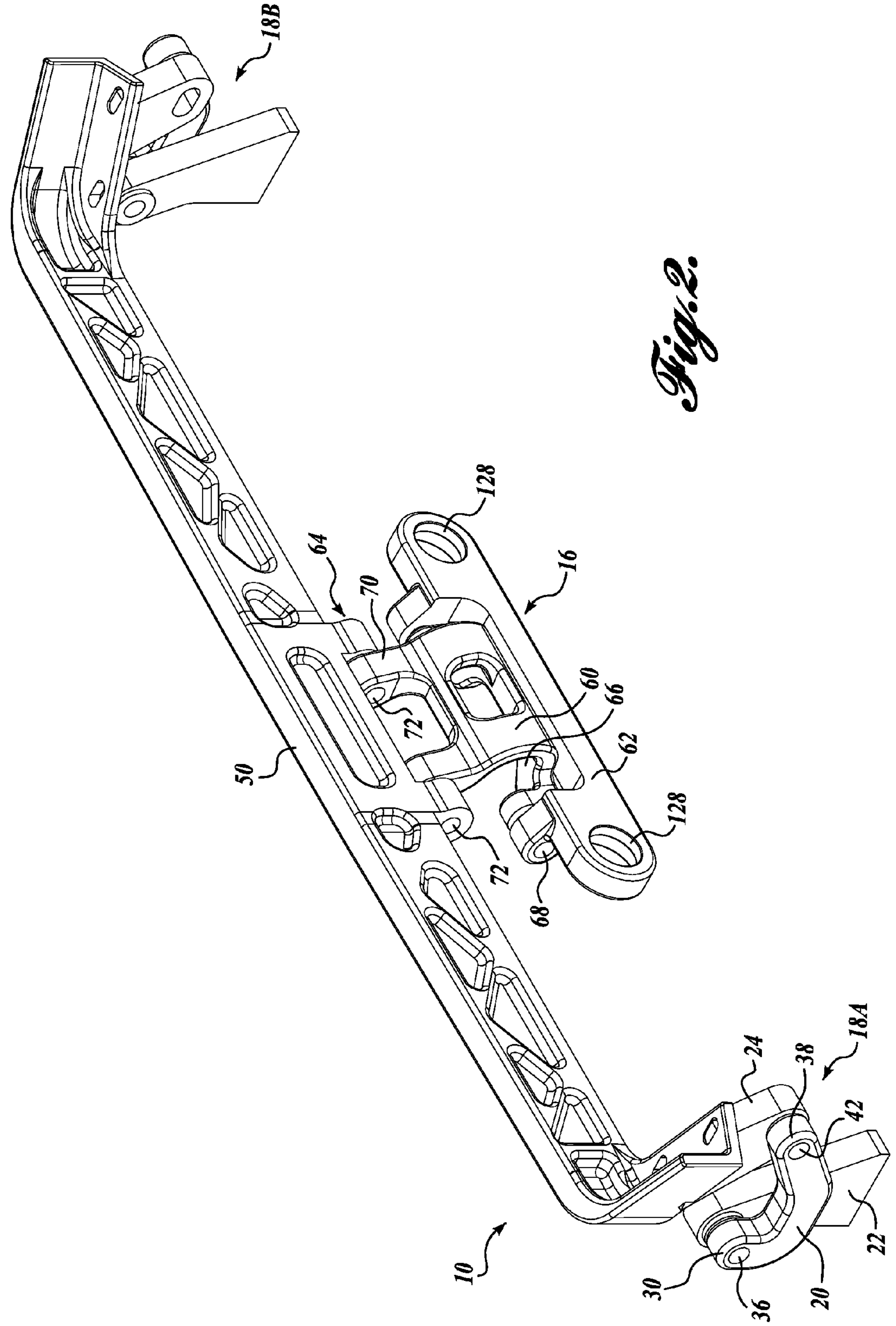
FIG. 2 is a rear isometric view of one example of a hood connection assembly formed in accordance with aspects of the present disclosure.
Figure 3:
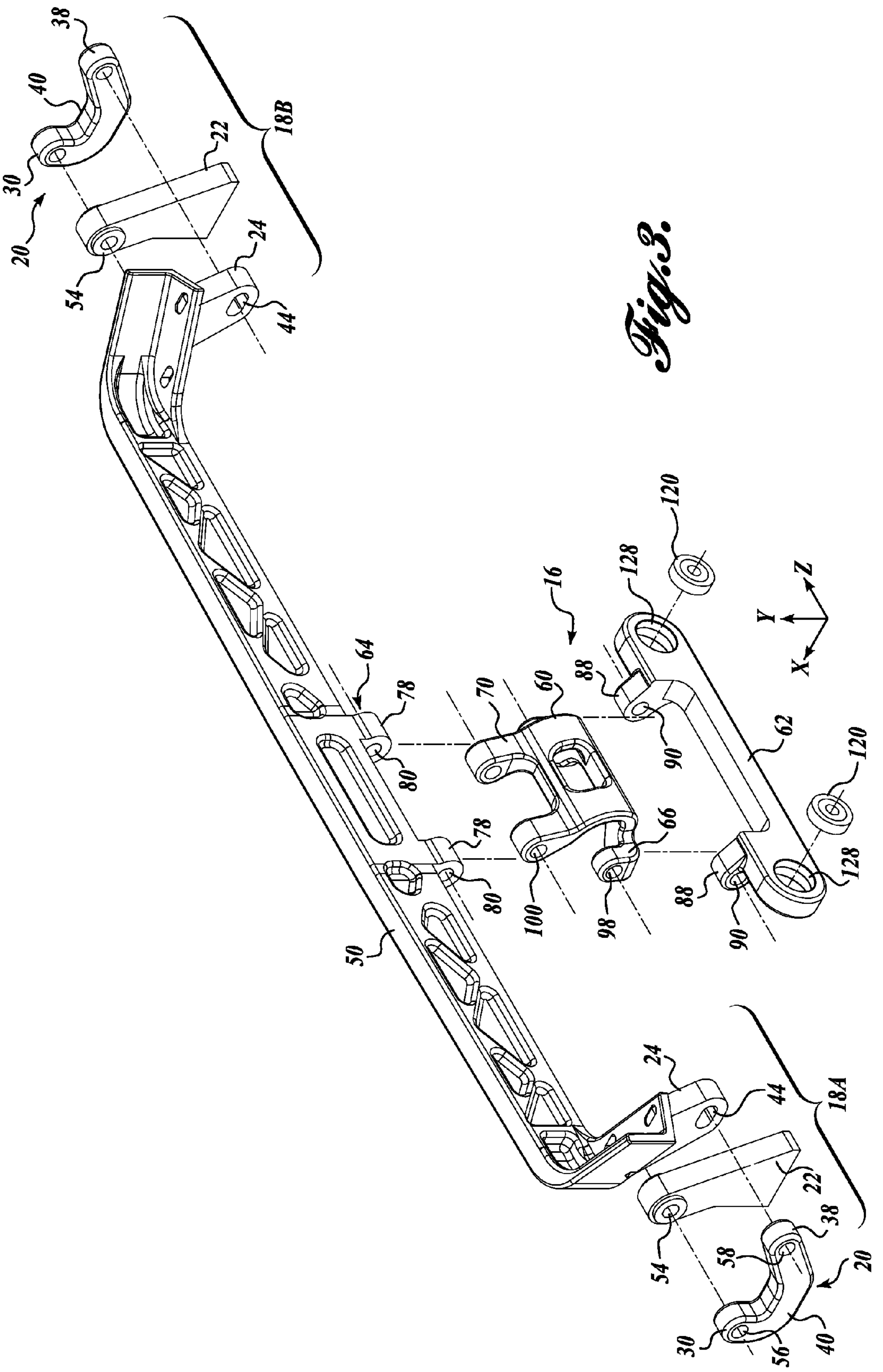
FIG. 3 is an exploded view of the hood connection assembly of FIG. 1.

As best shown in FIGS. 2 and 3, the hood connection assembly 10 includes a center coupling interface 16 and left and right (e.g., driver side and passenger side of North American vehicles) coupling interfaces 18A and 18B. The coupling interfaces 18A and 18B are positioned at locations laterally spaced from the center coupling interface 16. The construction and operation of the left and right coupling interfaces 18A and 18B are substantially similar, and thus, for brevity of the disclosure only the left side coupling interface 18A will be described in more detail. It will be appreciated that like or substantially similar components of the right side coupling interface 18B will have like numerals designated with a "B."

In the embodiment shown, the left coup ling interface 18A includes a link member 20, a chassis mount 22 and a hood mount 24. The link member 20 is pivotally coupled at its first end 30 to the upper portion of the chassis mount 22 about a fixed pivot 36 (i.e., fixed relative to the vehicle chassis). The second end 38 of the link member 20 is pivotally coupled to the outward end of the hood mount 24 about a pivot 42.

As best shown in FIG. 3, the hood mount 24 in one embodiment is fixedly secured to or integrally formed with a hood mounting bracket 50. The hood mount 24 extends from the hood mounting bracket 50 in a downwardly and rearwardly direction relative to the vehicle when the hood is in the closed position (See FIG. 4A). At the free end of the hood mount 24, there is formed a bore 44 configured for receiving a pivot pin or pintle 46 therethrough for defining the pivot 42. Of course, the pivot 42 can have other configurations, such as a cylindrical pivot post, etc. In the embodiment shown, the pivot 42 may be formed with a slightly elongated slot, thereby providing some adjustability to the location of the pivot 42 between the hood mount 24 and the link 20. As assembled, the pivot 42 is positioned rearwardly of the fixed pivot 36.

Figure 4A:
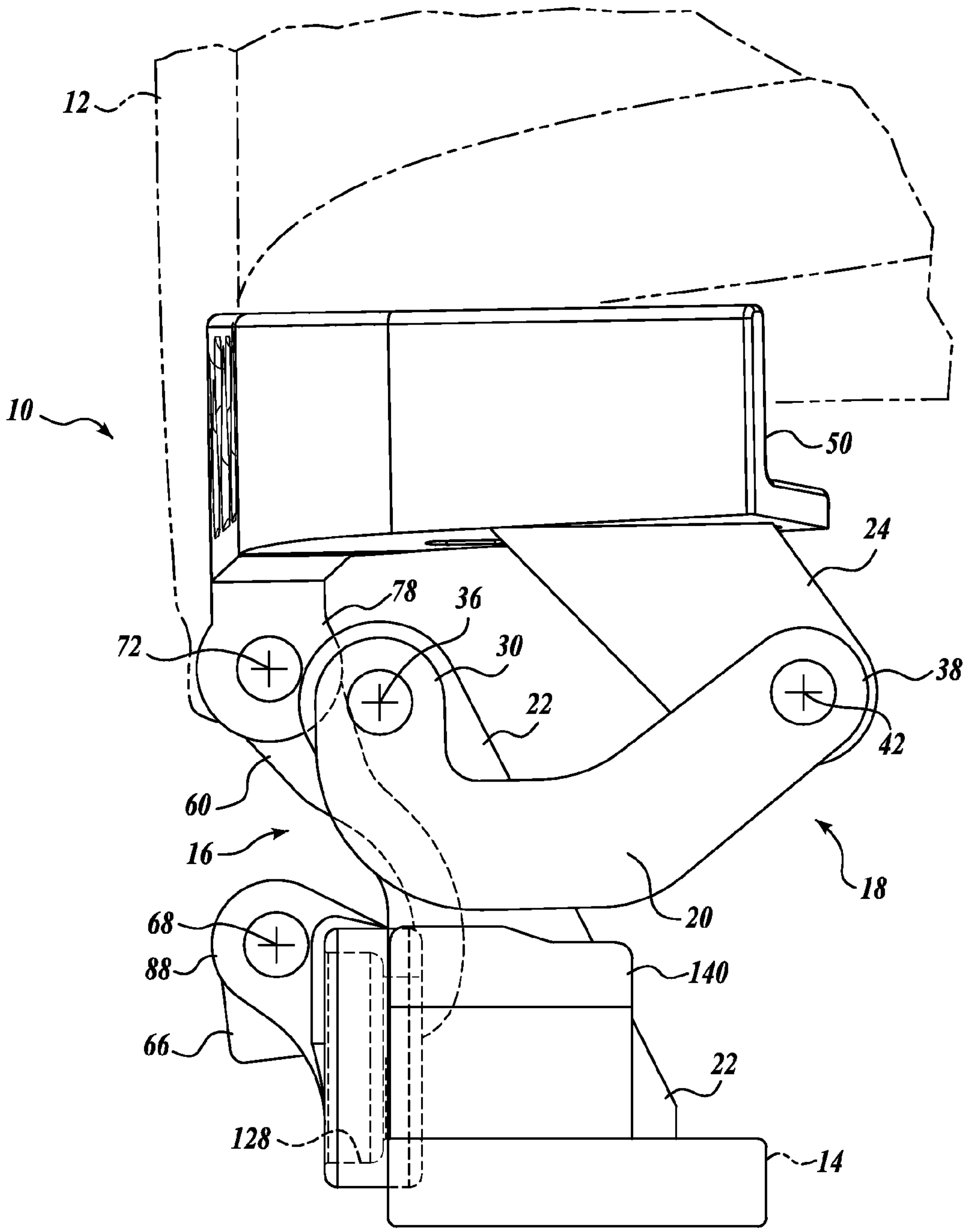
FIG. 4A-4D are side views of the hood connection assembly pivoting from a hood closed position of FIG. 4A through a hood open position of FIG. 4D.
Figure 4B:
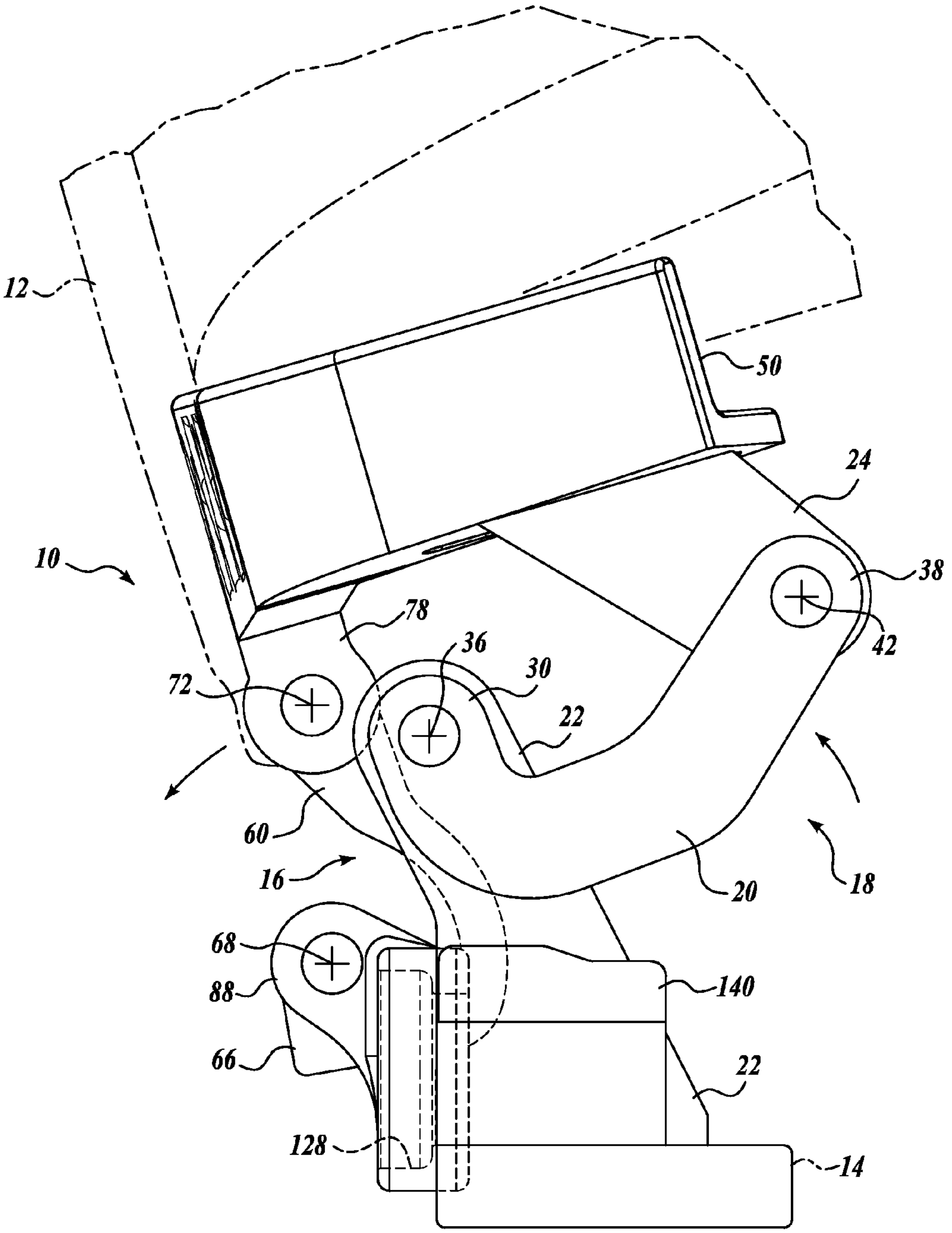
Figure 4C:
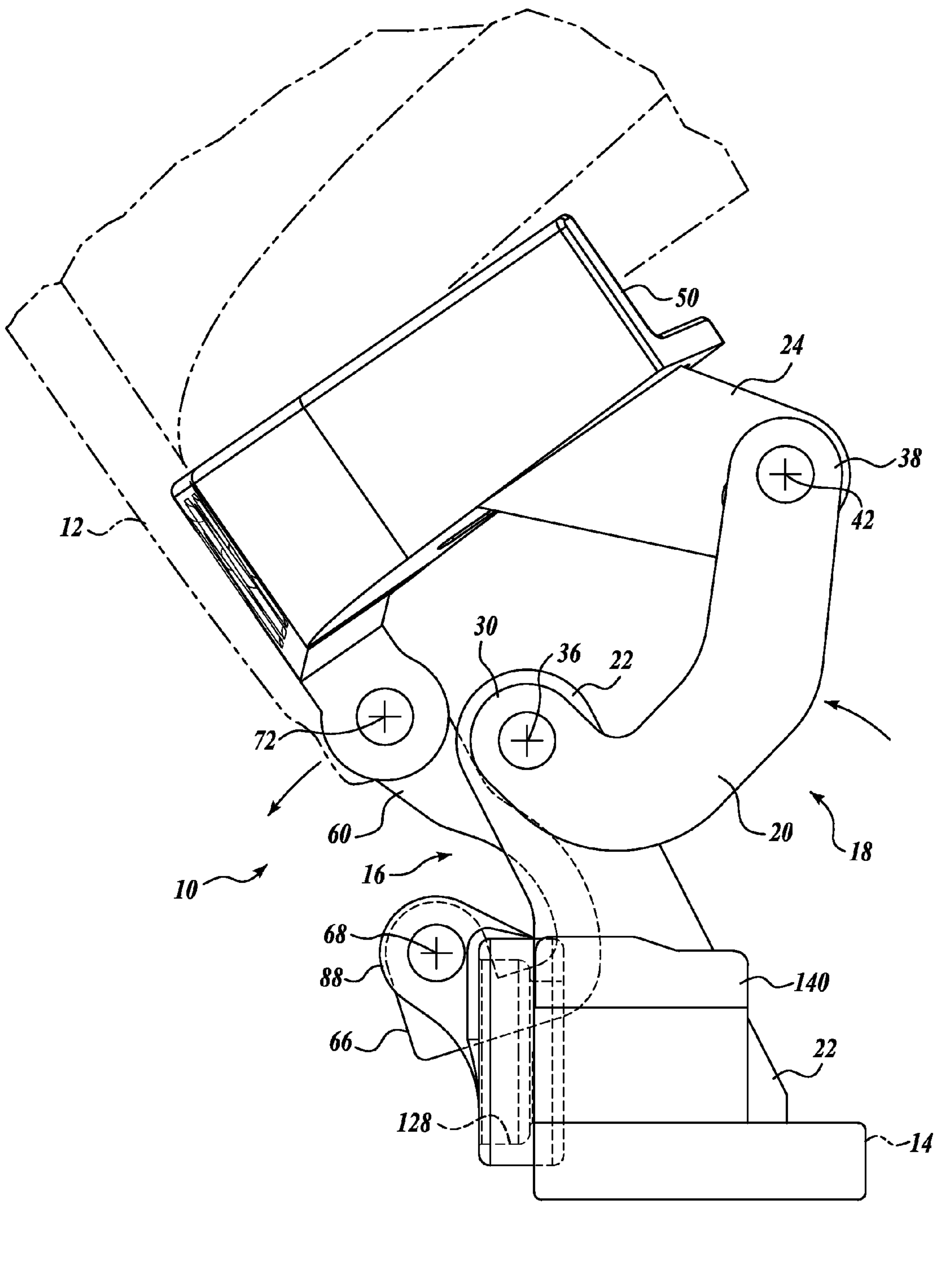
Figure 4D:
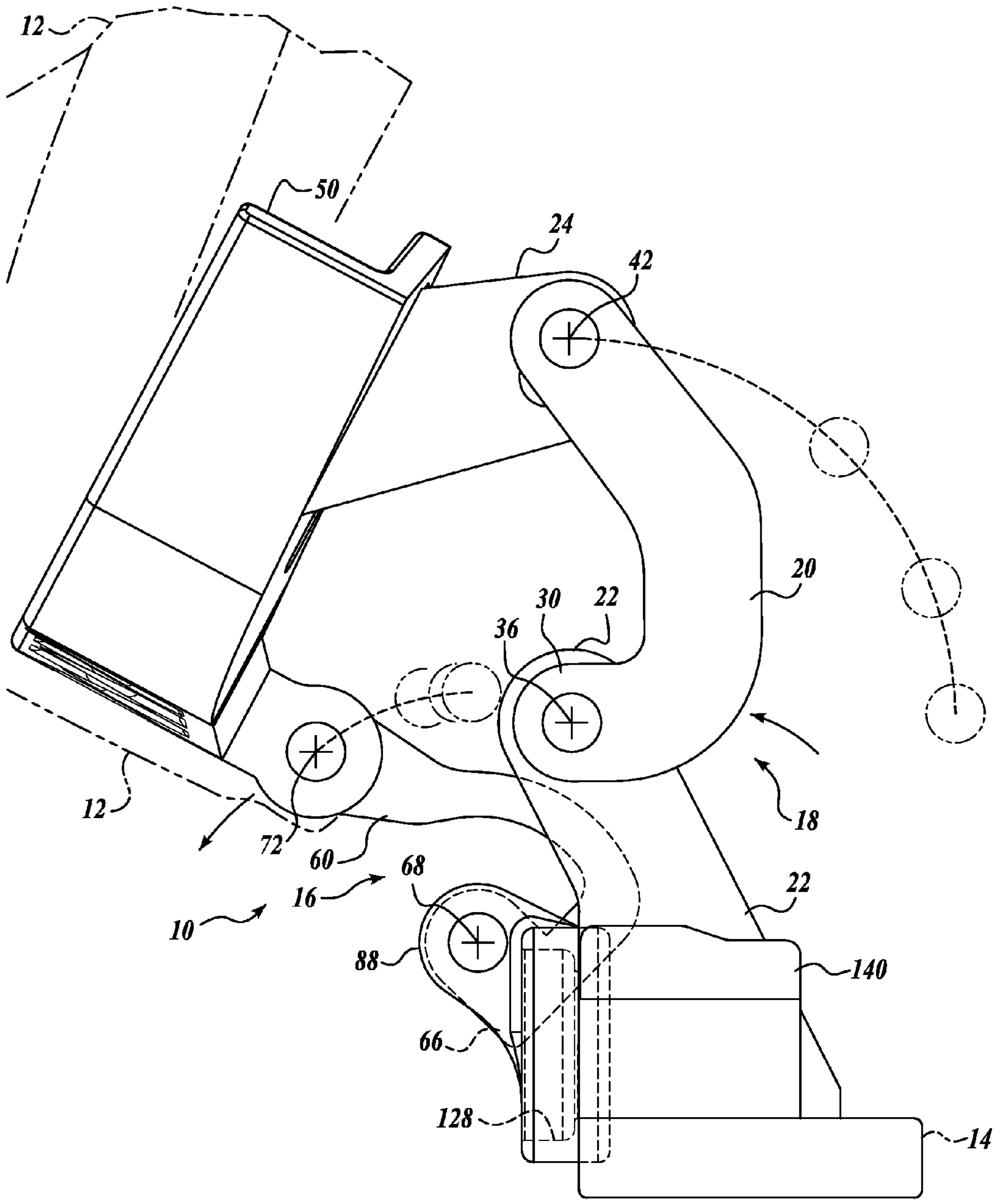

Similar to the hood mount 24, the chassis mount 22 in one embodiment is mounted to or integrally formed with a chassis structure 14. The chassis mount 22 extends in an upwardly and forwardly direction with respect to a horizontally oriented chassis surface, as best shown in FIG. 4A. The chassis mount 22 at its free end includes a cylindrical bore 54 configured for receiving a pivot pin or pintle therethrough for defining the fixed pivot 36. As assembled, the fixed pivot 36 is positioned outwardly and vertically below the pivot 42.

In the embodiment shown in FIGS. 2 and 3, the link member 20A is curved like a hook at the first end 30, and is generally slanted at the second end 38. In-between the first end 30 and the second end 38 is a generally straight middle potion 40. The first end 30 and the second end 38 include cylindrical bores 56 and 58, respectively, for receiving the pins or pintles of the fixed pivot 36 and pivot 42, respectively. As will be described in more detail below, the generally straight middle portion 40 contacts optional structure associated with the chassis mount 24 during operation of the vehicle. When assembled, the link members 20A and 20B form a four bar linkage in conjunction with the hood and the chassis member.

Still referring to FIGS. 2 and 3, the center coupling interface 12 will now be described in detail. In some embodiments, the center coupling interface 12 includes a link member 60, a chassis mount 62 and a hood mount 64. The link member 60 is pivotally coupled at its first end 66 to the chassis mount 22 about fixed pivots 68 (i.e., fixed relative to the vehicle chassis). The second end 70 of the link member 60 is pivotally coupled to the hood mount 24 about axially aligned pivots 72.

As best shown in FIGS. 2-3, the hood mount 64 in one embodiment is fixedly secured to or integrally formed with the hood mounting bracket 50. In the embodiment shown, the hood mount 64 extends from the hood mounting bracket 50 in a downwardly direction as lugs 78. The lugs 78 include aligned, cylindrical bores 80 configured for receiving either a single pivot pin or pintle or separate pivot pins or pintles, respectively, therethrough to form laterally aligned pivots 72. As assembled, the pivots 72 are positioned forwardly with regard to the fixed pivot 36, and above fixed pivot 68.

On the other hand, the chassis mount 62 in some embodiments is mounted to the vehicle chassis 14. In the embodiment shown, the chassis mount 62 includes spaced apart first and second lugs 88 that extend in an upwardly and outwardly direction with respect to the chassis member 14. The first and second lugs 88 include cylindrical bores 90 configured for receiving either a single pivot pin or pintle or separate pivot pins or pintles, respectively, therethrough to form laterally aligned fixed pivot 68. As assembled, the fixed pivots 68 are positioned forwardly with regard to the fixed pivots 36.

In the embodiment shown in FIGS. 2 and 3, the link member 60 is generally J-shaped. The first end 66 and the second end 70 include cylindrical bores 98 and 100, respectively, for receiving the pins or pintles of the fixed pivot 68 and the pivot 72, respectively.

It will be appreciated that the shape of the link member 60, the link members 20, the fixed locations of the pivots 36 and 68, and the position of the hood mounts 24, 64, are such that the hood 12 pivots upwardly and forwardly (outwardly in a forward direction) of the vehicle chassis 14 in a sweeping axis, sometimes referred to as a "virtual" axis. Please see the pivoting action of the coupling interfaces and the hood with respect to the chassis between FIGS. 4A-4D. By pivoting upwardly and outwardly, the hood does not interfere with differing bumper configurations and engine compartment components (e.g. radiator, charge cooler, etc.).

In embodiments of the present disclosure, the center coupling interface 12 and/or left/right coupling interfaces 18A and 18B are configured so as to provide up to 3 points of isolation from chassis torsion. In one embodiment, isolators 120, such as rubber grommets, urethane springs, etc., may be mounted between the chassis mount 62 and the chassis, as shown in FIG. 3 as one example, to isolate the hood from torsional movement of the chassis and to absorb vibration, etc. In that regard, the isolators 120 are configured and arranged to allow the hood to pivot about the longitudinal axis (i.e., x-axis) of the vehicle in order to accommodate torsional movement of the chassis. In the embodiment shown, the isolators 120 include rubber or elastomeric grommets that are positioned within the mounting bores 128 of the chassis mount 62. In that regard, longitudinally oriented fasteners (not shown), such as bolts, employed to mount the chassis mount 62 to the chassis 14 are routed through the isolators 120.

Additionally or alternatively, the right/left coupling interfaces 18A and 18B may include rubber or elastomeric contact pads 140. The contact pads 140 are mounted adjacent the chassis mount 22 and supported by chassis structure 14. The contact pads 140 are oriented along the longitudinal axis (i.e., x axis) of the vehicle. When the hood is in the closed position (See FIG. 4A), the contact pads 140 are positioned just below middle potion 40 of the link member 20. As a result, at predetermined degrees of chassis twist, which can be adjusted based on the vertical positioning of the contact pad 140, the contact pads 140 engage the right/left link member 20 to control and restrict x-axis pivoting/rocking of the hood 12 to a defined level. Limiting the amount of hood rotation about the x-axis prevents unwanted contact between the body panels of the hood bottom and bumper top. This may also extend the life of the central coupling interface.

It should be noted that for purposes of this disclosure, terminology such as "upper," "lower," "vertical," "horizontal," "fore," "aft," "inner," "outer," "front," "rearward," "forward," "downward," "distal," "proximal," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed The embodiments of the invention in which an exclusive property or privilege is claimed are defined as follows:

1. A hood pivot linkage assembly configured to articulatingly mount a hood to a chassis member, comprising:

a central coupling interface including a link member configured to be pivotally coupled at a first end to the hood and pivotally coupled at a second end to the chassis member via a chassis mount about a first fixed axis, wherein the chassis mount is configured to isolate the hood from torsional movement of the chassis member;

first and second lateral coupling interfaces spaced from and flanking the central coupling interface, the first and second lateral interfaces each including a link member configured to be pivotally coupled at a first end to the hood and pivotally coupled at a second end to the vehicle chassis via a chassis mount about a second fixed axis, wherein the first and second coupling interfaces form a four bar linkage in conjunction with the hood and the chassis member.

2. The assembly of claim 1, wherein the chassis mount of the central coupling interface includes one or more isolators for interfacing with the chassis member, wherein the isolators are configured to isolate the hood from torsional movement of the chassis member.

3. The assembly of claim 2, wherein the one or more isolators are configured and arranged to allow some pivoting movement about an axis perpendicular to the first fixed axis.

4. The assembly of claim 3, further comprising contact pads associated with the first and second lateral coupling interfaces, wherein the contact pads are configured and arranged so as to define the range of pivoting movement of the hood about an axis perpendicular to the first fixed axis.

5. The assembly of claim 1, further comprising a hood bracket, wherein the hood bracket includes hood mounts of the first and second lateral coupling interfaces and a hood mount of the central coupling interface.

6. The assembly of claim 1, wherein the first fixed axis is positioned forwardly of the second fixed axis.

7. The assembly of claim 1, wherein a third axis is defined by the link member of the central coupling interface being pivotally coupled to the hood, the third axis being forwardly of the second fixed axis.

8. The assembly of claim 7, wherein a fourth axis is defined by the link members of the first and second lateral coupling interfaces being pivotally coupled to the hood, the fourth axis being rearwardly of the first fixed axis, the second fixed axis, and the third axis.

9. The assembly of claim 1, wherein the link member of the central coupling interface is J-shaped.

10. A vehicle hood connection assembly for articulatingly mounting a hood to a chassis member, comprising:

a central coupling interface including a link member, a hood mount configured to be mountable to the hood, and a chassis mount configured to be mountable to the chassis member, the link member configured to be pivotally coupled at a first end to the hood mount about a first pivot and pivotally couple at a second end to the chassis mount about a second, fixed pivot, wherein the chassis mount is configured to allow some rotation of the central coupling interface about a second axis generally perpendicular to the pivot axis of the second fixed pivot;

left and right coupling interfaces spaced from and flanking the central coupling interface, the left and right coupling interfaces each including a link member, a hood mount configured to be mountable to the hood, and a chassis mount configured to be mountable to the chassis member, the link member of the left and right coupling interfaces configured to be pivotally coupled at a first end to the hood mount of the left and right coupling interfaces about a third pivot and pivotally couple at a second end to the chassis mount of the left and right coupling interfaces about a fourth, fixed pivot, wherein the left and right coupling interfaces form a four bar linkage in conjunction with the hood and the chassis member when coupled thereto.

11. The vehicle hood connection assembly of claim 10, wherein the second fixed pivot is positioned forwardly of the fourth fixed pivot, and the first pivot is positioned rearwardly of both the fourth fixed pivot and the first pivot.

12. The assembly of claim 10, wherein the chassis mount of the central coupling interface includes one or more isolators for interfacing with the chassis member, wherein the isolators are configured to isolate the hood from torsional movement of the chassis member.

13. The assembly of claim 12, further comprising contact pads associated with the left and right coupling interfaces, wherein the contact pads are configured and arranged so as to define the range of pivoting movement of the hood about the axis perpendicular to the first fixed pivot.

14. A vehicle, comprising:
a chassis structure;
a hood; and
a hood coupling configured to coupled a forward portion of the hood to the chassis structure in an articulating manner, wherein the hood coupling includes
a central coupling interface including a link member, a hood mount configured to be mountable to the hood, and a chassis mount configured to be mountable to the chassis structure, the link member configured to be pivotally coupled at a first end to the hood mount about a first pivot and pivotally couple at a second end to the chassis mount about a second, fixed pivot, wherein the chassis mount is configured to allow some rotation of the central coupling interface about a second axis generally perpendicular to the pivot axis of the second fixed pivot;
left and right coupling interfaces spaced from and flanking the central coupling interface, the left and right coupling interfaces each including a link member, a hood mount configured to be mountable to the hood, and a chassis mount configured to be mountable to the chassis structure, the link member of the left and right coupling interfaces configured to be pivotally coupled at a first end to the hood mount of the left and right coupling interfaces about a third pivot and pivotally couple at a second end to the chassis mount of the left and right coupling interfaces about a fourth, fixed pivot,
wherein the left and right coupling interfaces form a four bar linkage in conjunction with the hood and the chassis structure when coupled thereto.

15. The vehicle of claim 14, wherein the second fixed pivot is positioned forwardly of the fourth fixed pivot, and the first pivot is positioned rearwardly of both the fourth fixed pivot and the first pivot.

16. The vehicle of claim 14, wherein the chassis mount of the central coupling interface includes one or more isolators for interfacing with the chassis member, wherein the isolators are configured to isolate the hood from torsional movement of the chassis member.

17. The vehicle of claim 16, further comprising contact pads associated with the left and right coupling interfaces, wherein the contact pads are configured and arranged so as to define the range of pivoting movement of the hood about the axis perpendicular to the first fixed pivot.

18. The vehicle of claim 14, further comprising a hood bracket, wherein the hood bracket includes the hood mount of the central coupling interface and the hood mounts of the left and right coupling interface.

* * * * *

UNITED STATES PATENT AND TRADEMARK OFFICE

CERTIFICATE OF CORRECTION

PATENT NO. : 8,887,849 B2
APPLICATION NO. : 13/840437
DATED : November 18, 2014
INVENTOR(S) : S. D. Hite It is certified that error appears in the above-identified patent and that said Letters Patent is hereby corrected as shown below:

IN THE CLAIMS:

| COLUMN | LINE | ERROR |
|---|---|---|
| 6 | 45 | "pivotally couple" to -- pivotally coupled -- |
| Claim 10 | 8 | |
| 7 | 14 | "to coupled" to -- to couple -- |
| Claim 14 | 4 | |
| 7 | 22 | "pivotally couple" to -- pivotally coupled -- |
| Claim 14 | 12 | |
| 8 | 6 | "couple at" to -- coupled at -- |
| Claim 14 | 27 | |

Signed and Sealed this
Twenty-third Day of June, 2015

Michelle K. Lee

Michelle K. Lee
*Director of the United States Patent and Trademark Office*